United States Patent
Pollack

(10) Patent No.: US 6,505,236 B1
(45) Date of Patent: Jan. 7, 2003

(54) NETWORK-BASED MAIL ATTACHMENT STORAGE SYSTEM AND METHOD

(75) Inventor: Jordan Pollack, Sudbury, MA (US)

(73) Assignee: Thinmail, Inc., Sudbury, MA (US)

( * ) Notice: Subject to any disclaimer, the term of this patent is extended or adjusted under 35 U.S.C. 154(b) by 0 days.

(21) Appl. No.: 09/302,877

(22) Filed: Apr. 30, 1999

(51) Int. Cl.$^7$ .............................................. G06F 15/16
(52) U.S. Cl. ...................... 709/206; 709/200; 709/202; 709/213; 709/232; 709/245; 709/246
(58) Field of Search ................................ 709/200–203, 709/206–207, 213, 217–219, 229, 232, 238, 245–246; 707/10, 104, 513, 522–523

(56) References Cited

U.S. PATENT DOCUMENTS

| | | | | |
|---|---|---|---|---|
| 5,418,908 A | | 5/1995 | Keller et al. | 709/206 |
| 5,592,375 A | | 1/1997 | Salmon et al. | 705/7 |
| 5,675,507 A | * | 10/1997 | Bobo, II | 709/206 |
| 5,737,414 A | | 4/1998 | Walker et al. | 705/40 |
| 5,765,033 A | * | 6/1998 | Miloslavsky | 709/206 |
| 5,771,355 A | | 6/1998 | Kuzma | 709/232 |
| 5,779,549 A | | 7/1998 | Walker et al. | 463/42 |
| 5,781,901 A | | 7/1998 | Kuzma | 707/10 |
| 5,790,790 A | * | 8/1998 | Smith et al. | 709/206 |
| 5,793,972 A | * | 8/1998 | Shane | 709/219 |
| 5,832,221 A | | 11/1998 | Jones | 709/206 |
| 5,903,723 A | * | 5/1999 | Beck et al. | 709/200 |
| 5,951,636 A | * | 9/1999 | Zerber | 709/202 |
| 6,009,462 A | * | 12/1999 | Birrell et al. | 709/206 |
| 6,014,688 A | * | 1/2000 | Venkatraman et al. | 709/206 |
| 6,052,735 A | * | 4/2000 | Ulrich et al. | 709/236 |
| 6,073,133 A | * | 6/2000 | Chrabaszcz | 709/200 |
| 6,216,165 B1 | * | 4/2001 | Woltz et al. | 709/232 |
| 6,275,850 B1 | * | 8/2001 | Beyda et al. | 709/206 |
| 6,327,612 B1 | * | 12/2001 | Watanabe | 709/206 |
| 6,427,164 B1 | * | 7/2002 | Reilly | 709/206 |

OTHER PUBLICATIONS

Microsoft Press, "Computer Dictionary", pp. 395 and 487, 1997.*

Dave Kosiur, *E–Mail Grows Up*, Dec. 1996.

Charles Arthur, *Identity Crisis on the Internet: Well–Connected Internet Users Who Distribute Secret or Sensitive Information Without Revealing Their Names are Playing Havoc with National Laws*, Mar. 11, 1995.

* cited by examiner

Primary Examiner—Bharat Barot
(74) Attorney, Agent, or Firm—Iandiorio & Teska

(57) ABSTRACT

A network-based mail attachment storage system and method for: receiving from a sender an electronic mail item which contains a forwarding specification and an attachment; detaching the attachment from the electronic mail item; storing the attachment on a storage device at a specific address under a specific file name; generating a handle corresponding to the specific address and the specific file name; appending the electronic mail item to include the handle; and transmitting in accordance with the forwarding specification the appended electronic mail item, including the handle but excluding the stored attachment.

31 Claims, 4 Drawing Sheets

NETWORK-BASED MAIL ATTACHMENT STORAGE SYSTEM AND METHOD

FIELD OF INVENTION

This invention relates to a network based mail attachment storage system and method, and more specifically to such a system and method which detaches and stores any mail attachments and appends the body of the mail to include a handle to enable the recipient to retrieve the stored attachment at a later time.

BACKGROUND OF INVENTION

The internet allows for a vast amount of information to be instantly disseminated to a worldwide audience. Additionally, the use of electronic mail (e-mail) has enabled users to communicate for free (or essentially free) with other users around the world. Electronic e-mail systems have allowed for time zones and country borders to virtually disappear, as people around the world are able to collaborate and exchange ideas as if they were all in the same town. However, all this free exchange of information does not come without cost.

Advertisers quickly learned that it is fiscally prudent to blindly solicit advertisements over the internet via e-mail, as opposed to the more traditional method of mass mailings. This unwanted and unsolicited e-mail (commonly known as SPAM mail) results in e-mail users receiving unwanted e-mail that is equivalent to unwanted telemarketer phone calls and traditional postal junk mail. Further, as primitive e-mail systems evolved into the complex systems of today, the ability to attach large data files to e-mail began to be commonplace.

While e-mail messages are quite small (approximately 1 kilobyte each), the size of the attachment attached to this modestly-sized e-mail can be megabytes. Therefore, it is possible for someone to attach a 10 megabyte file to a 1 kilobyte e-mail, creating a file which is quite large and cumbersome. Further, since the outstanding majority of users access their e-mail via dial-up accounts using analog modems, this creates a situation in which an e-mail with an attachment having a total size of 10 megabytes can take approximately 50 minutes to download on an analog 56K modem. This creates a frustrating situation for the home user who simply wants to check his or her e-mail after work, only to find out that a distant co-worker has e-mailed you an unwanted sound file via an e-mail attachment. This e-mail attachment, of which there may be more than one, makes the process of downloading your e-mail (which would typically take under a minute) to a process that can take an hour or more.

SUMMARY OF INVENTION

It is therefore an object of this invention to provide such a network-based mail attachment storage system and method which allows a user to quickly and easily download e-mail.

It is a further object of this invention to provide such a system which detaches email attachments from a user's e-mail so that the body of the e-mail can be downloaded quickly.

It is a further object of this invention to provide such a system which stores the detached e-mail attachment and appends the body of the e-mail to include a handle which allows the user to retrieve the e-mail attachment at a later time.

This invention results from the realization that a truly effective mail attachment storage system and method can be achieved by accepting an e-mail containing an attachment and a forwarding specification, detaching the attachment and storing it on a network server for later retrieval, appending the e-mail to include a handle and transmitting, in accordance with the forwarding specification, the appended e-mail, but not the stored attachment, so that the intended recipient, at his election, can retrieve the stored attachment at a later time, via the handle.

This invention features a network-based mail attachment storage system comprising: a receiving portal for receiving from a sender an electronic mail item which contains a forwarding specification and an attachment; an attachment stripper for detaching the attachment from the electronic mail item; a storage device for storing the stripped attachment at a specific address under a specific file name; a handle generator for generating a handle corresponding to the specific address and the specific file name which allows access to the attachment stored at the specific address under the specific file name; a handle appender for appending the handle to the electronic mail item; and a transmitting portal for transmitting in accordance with the forwarding specification the appended electronic mail item including the handle but excluding the stored attachment.

In a preferred embodiment, the network-based mail attachment storage system may include a parser for extracting a recipient address from the forwarding specification. The network-based mail attachment storage system may include an attachment retriever for enabling the recipient to retrieve at a later date the stored attachment stored under the specific file name at the specific address via the handle. The network-based mail attachment storage system may include a policy interpreter for determining if the recipient is to be charged a fee for retrieving the stored attachments. The network-based mail attachment storage system may include a deletion timer for calculating a deletion time after which the stored attachment is deleted. The network-based mail attachment storage system may include an attachment deleter for deleting the stored attachment upon the expiration of the deletion time. The network-based mail attachment storage system may include a sender notifier for notifying the sender when the recipient retrieved the stored attachment. The network-based mail attachment storage system may include an attachment comparator for comparing the stored attachment to previously-stored attachments to determine if any attachments are identical. The network-based mail attachment storage system may include a redundancy deleter which deletes a stored attachment when it is identical to a previously-stored attachment. The network-based mail attachment storage system may include a handle redirector for redirecting the handle pointing to the deleted attachment so that it points to the identical previously-stored attachment. The handle may be a uniform resource locator. The storage device may be chosen from the group consisting of hard drives, optical drives, random access memories, tape drives and RAID arrays.

This invention also features a network-based mail attachment storage method comprising the steps of: receiving from a sender an electronic mail item which contains a forwarding specification and an attachment; detaching the attachment from the electronic mail item; storing the attachment on a storage device at a specific address under a specific file name; generating a handle corresponding to the specific address and the specific file name; appending the electronic mail item to include the handle; and transmitting in accordance with the forwarding specification the appended electronic mail item including the handle but excluding the stored attachment.

In a preferred embodiment, the network-based mail attachment storage method may include the step of calculating a deletion time upon which the stored attachment is to be deleted. The network-based mail attachment storage method may include the step of deleting the stored attachment upon the expiration of the deletion time. The step of receiving may further include a recipient address in the forwarding specification and the network-based mail attachment storage method may include the step of notifying the sender when the recipient retrieved the stored attachment.

This invention also features a computer-readable medium having a plurality of instructions stored thereon which, when executed by the processor, cause the processor to perform the steps of: receiving from a sender an electronic mail item which contains a forwarding specification and an attachment; detaching the attachment from the electronic mail item; storing the attachment on a storage device at a specific address under a specific file name; generating a handle corresponding to the specific address and the specific file name; appending the electronic mail item to include the handle; and transmitting in accordance with the forwarding specification the appended electronic mail item including the handle but excluding the stored attachment.

In a preferred embodiment, the computer readable medium may be a hard drive. The computer readable medium may be a read-only memory. The computer readable medium may be a random-access memory.

This invention also features a processor and memory configured to perform the steps of: receiving from a sender an electronic mail item which contains a forwarding specification and an attachment; detaching the attachment from the electronic mail item; storing the attachment on a storage device at a specific address under a specific file name; generating a handle corresponding to the specific address and the specific file name; appending the electronic mail item to include the handle; and transmitting in accordance with the forwarding specification the appended electronic mail item, including the handle but excluding the stored attachment.

In a preferred embodiment the processor and memory are incorporated into a personal computer. The processor and memory may be incorporated into a programmable logic controller. The processor and memory may be incorporated into a single-board computer. The processor and memory may be incorporated into an array of network servers.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
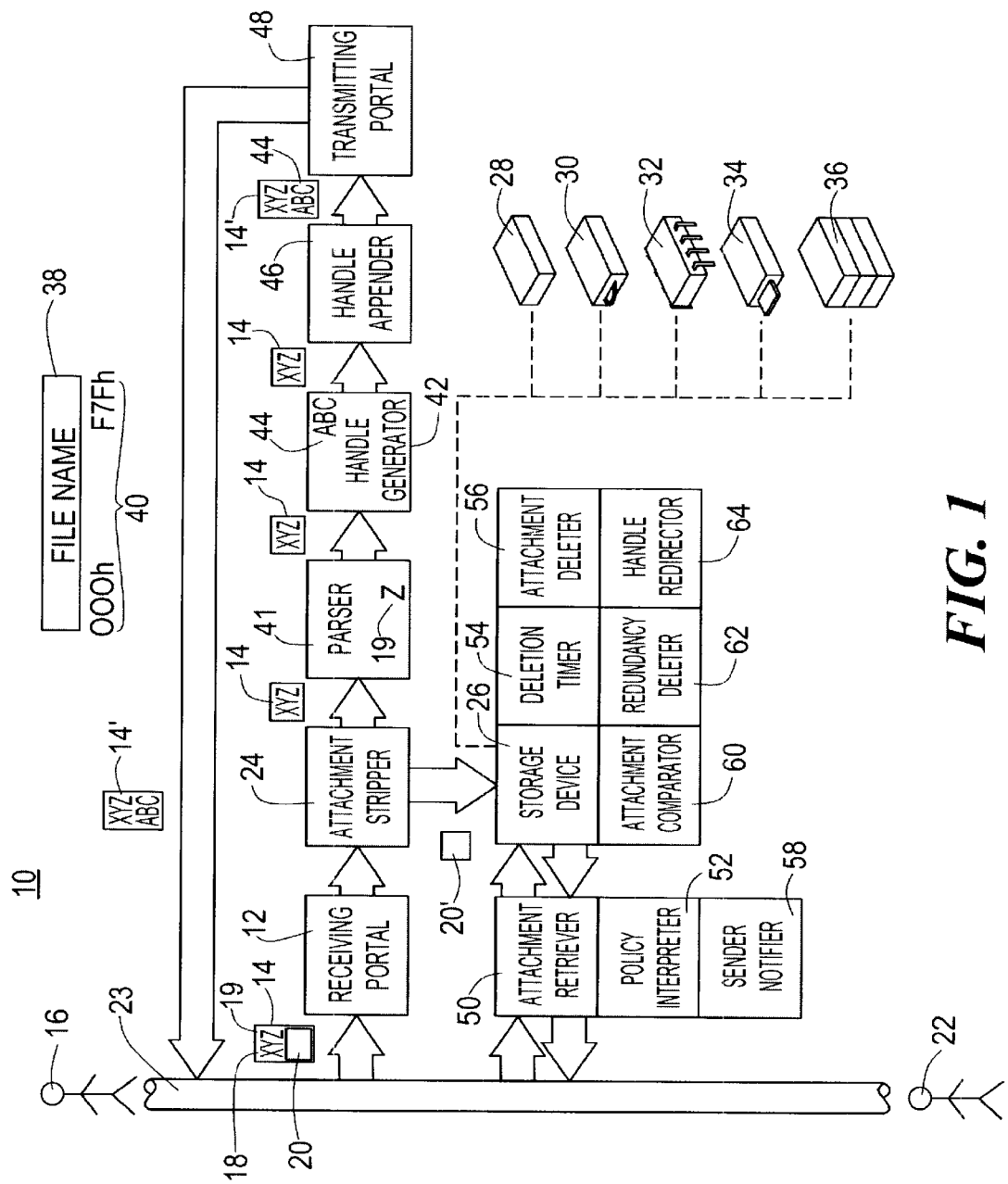
FIG. 1 is a diagrammatic view of the network-based mail attachment storage system according to this invention.

In accordance with this invention, network-based mail attachment storage system 10, FIG. 1, includes a receiving portal 12 for receiving an electronic mail item 14 from a sender 16. The electronic mail item 14 includes a forwarding specification 18 and an attachment 20. While the body of the email mail message is typically quite small (approximately 1 kilobyte), the size of the attachment can be megabytes. This electronic mail item transmitted from sender 16 to recipient 22 is transmitted via some form of computer network 23, such as the Internet, an Intranet or a standard local area network (e.g. Ethernet, Arcnet or Token Ring).

While the potential large size of the mail item attachment 20 is not a problem for users having high-bandwidth network connections (e.g. T-1, DSL, Cable Modem or ISDN connections), the typical user accesses the Internet via a dial-up analog modem connection, having a maximum bandwidth of approximately 56 kilobytes/second. As stated in the background, these low bandwidth connections, when combined with large attachment file sizes, create a situation where the process of retrieving electronic mail (or e-mail) is extended from several minutes to an hour or more.

In order to eliminate this potential bandwidth bottleneck, the network-based mail attachment storage system 10 includes an attachment stripper 24 for detaching attachment 20 from mail item 14, which generates stripped attachment 20'. Storage device 26 stores stripped attachment 20'. This storage device can be any typical storage device known to those skilled in the art, such as hard drives 28, optical drives 30, static or dynamic RAM 32, tape drives 34 or RAID arrays 36. Additionally, experimental storage devices, such as molecular and protein-based, can be utilized. Storage device 26 stores stripped attachment 20' under a specific filename 38 at a specific address 40. The file naming/addressing scheme can be any of those commonly known in the art (e.g. hexadecimal addressing, filename and path specification, etc.).

Parser 41 processes forwarding specification 18 to extract the recipient address 19 of the intended recipient 22. There are numerous ways in which recipient address 19 can be encoded within forwarding specification 18, such as:

(I) forwarding specification 18 could simply be the forwarding address of electronic mail item 14. For example, sender 16 could address mail item 14 to the network-based mail attachment storage system 10 (e.g. forward@thinmail.com) and include a forwarding address which is the address of recipient 22 in a header field (e.g. forward to: recipient@anycompany.com). In this case, parser 41 would determine the recipient address 19 to be the forwarding address (recipient@anycompany.com);

(II) electronic mail item 14 may contain only a single address (as opposed to the dual address scheme of (I)) where the recipient address 19 is encoded within the forwarding specification 18. For example, sender 16 could address mail item 14 to "recipient%anycompany.com@thinmail.com", where parser 41 would extract anything to the left of the "@" sign and convert the "%" symbol to the "@" sign. This, in turn, would result in the recipient address 19 being "recipient@anycompany.com";

(III) since some mail systems use the "%" sign to route email, it may be desirable not to use the "%" symbol. In this case, any other symbol could be used. Sender 16 could simply specify the symbol to be converted as the symbol before the "@" sign. For example, sender 16 could address mail item 14 to "recipient$anycompany.com$@thinmail.com", where parser 41 would extract anything to the left of the "@" sign. Parser 41 would then look at the rightmost symbol "$" in the extracted address and convert that symbol to an "@" sign. This would result in the recipient address 19 being "recipient@anycompany.com"; or (IV) alternatively, sender 16 could address mail item 14 to a predefined address at the network-based mail attachment storage system 10 (e.g. ibmlist1@thinmail.com). Parser 41 will recognize this embedded address (ibmlist1) and associate it with a user defined distribution list of recipient addresses. This allows stored attachment 20' to be distributed to several recipients simultaneously.

Handle generator 42 generates a handle 44 that corresponds to the filename 38 and address 40 of the stored attachment 20' stored on storage device 26. While this handle 44 can be a uniform resource locator, such as an address or a hypertext link (e.g. http:\\www.thinmail.com/105321.wav), it need not be. For example, handle 44 can be a PIN number (e.g. 107463) which, in conjunction with a lookup table which relates the PIN number to the filename/storage location, allows access to stored attachment 20' without specifically locating the file and specifying its filename.

In so Handle appender 46 appends handle 44 to electronic mail item 14 to create appended electronic mail item 14'. Appended electronic mail item 14', which includes handle 44 but does not include stored attachment 20', is transmitted to recipient 22 via transmitting portal 48 over network 23. Mail item 14 and appended electronic mail item 14' can be in any of a variety of available formats, such as: Rich Text Format; ASCII Text Format; HTML Format; and Unicode Format.

Please note that attachment stripper 24, has handle generator 44 and handle appender 46 may be combined into a single process which substitutes a handle for a portion of data in any of a variety of e-mail formats. For example, attachment 20 may be any definable portion of the data comprising mail item 14 and not specifically a file attached to mail item 14.

Appended electronic mail item 14' can be downloaded by recipient 22 considerably quicker than original electronic mail item 14 (which included attachment 20) due to the significantly smaller size of appended mail item 14'. Once recipient 22 downloads appended electronic mail item 14, he can retrieve stored attachment 20'. from storage device 26 using handle 44.

Network-based mail attachment storage system 10 includes attachment retriever 50 which enables recipient 22 to retrieve stored attachment 20' from storage device 26. Recipient 22, having received appended electronic mail item 14', uses handle 44 in conjunction with attachment retriever 50 to access stored attachment 20'. Typically, attachment retriever 50 will be resident on a network (or web) server or a series of servers and recipient 22 will access attachment retriever 50 via a web browser or any other proprietary program, HTML enabled e-mail reader or web browser plug in. Attachment retriever 50, upon receiving a request from recipient 22 to download stored attachment 20', analyzes handle 44 to determine the address 40 and filename 38 of stored attachment 20' so that it can be downloaded by recipient 22. Alternatively, attachment 20' can be previewed, translated, or downloaded in a streaming format to recipient 22.

Network-based mail attachment storage system 10 includes a policy interpreter 52 which determines if recipient 22 is to be charged a fee for retrieving stored attachment 20'. This fee policy can be adjusted depending on the users of the service. Typically, a non-recurring recipient 22 who received an appended electronic mail item 14' will not be charged a fee for retrieving the related stored attachment 20'. When recipient 22 attempts to retrieve stored attachment 20', upon determining that recipient 22 is not to be charged a fee, policy interpreter 52 will direct recipient 22 to a "free" retrieval area which features an assortment of banner ads to defray the cost of administering the system. Alternatively, for example, if sender 16 wishes to use the network-based mail attachment storage system 10 to distribute an attachment to a large number of people, sender 16 could be charged a fee for distributing the attachment to its intended recipients. These two examples are for illustrative purposes only and are not intended to limit this disclosure in any way. The administrator of the network-based mail attachment storage system 10 can configure policy interpreter 52 to bill the recipient and/or sender in any fashion desired. Additionally, a sender notifier 58 notifies sender 16 once recipient 22 retrieves stored attachment 20'. This notification can be sent via network 23 in the form of an electronic mail item.

When stored attachment 20' is stored on storage device 26, deletion timer 54 calculates a deletion time after which stored attachment 20' will be deleted. In the event that stored attachment 20' is not retrieved by the expiration of the deletion time calculated by deletion timer 54, attachment deleter 56 will delete stored attachment 20'. Deletion timer 54 and attachment deleter 56 help prevent the build up of non-retrieved attachments on storage device 26.

Often, a sender will wish to distribute a single attachment to numerous recipients. Alternatively, two separate recipients may be receiving the same attachment from two different senders. Either way, this results in storage device 26 not being utilized in an efficient fashion, as multiple copies of the same attachment are simultaneously being stored on storage device 26. When an attachment 20' is being stored on storage device 26, attachment comparator 60 compares the attachment being stored to all stored attachments to determine if the newly stored attachment is the same as any stored attachment. Attachment comparator 60 compares the files to determine if the files are the same. In the event that the newly stored file is identical, and therefore redundant, with a file previously stored on storage device 26, redundancy deleter 62 will delete the newly stored attachment so that only a single copy of the file is stored on storage device 26. Further, since this deletion will result in a handle being generated which points to a deleted file, handle redirector 64 will redirect handle 44 so that it properly points to the previously stored attachment. This redirection can occur in several ways. For example, the handle redirection can occur prior to transmitting appended electronic mail item 14' to recipient 22. If this occurs, the handle 44 transmitted to the recipient 22 will contain the accurate address and, therefore, no further redirection is required. Alternatively, the redirection can occur after the appended electronic mail item is transmitted to recipient 22. If this occurs, handle redirector 64 will notify attachment retriever 50 that the specific handle had been redirected and, therefore, when recipient 22 attempts to retrieve stored attachment 20' via handle 44, attachment retriever 50 will know that the new storage location of the deleted attachment is actually the storage location of the previously stored attachment.

Figure 2:
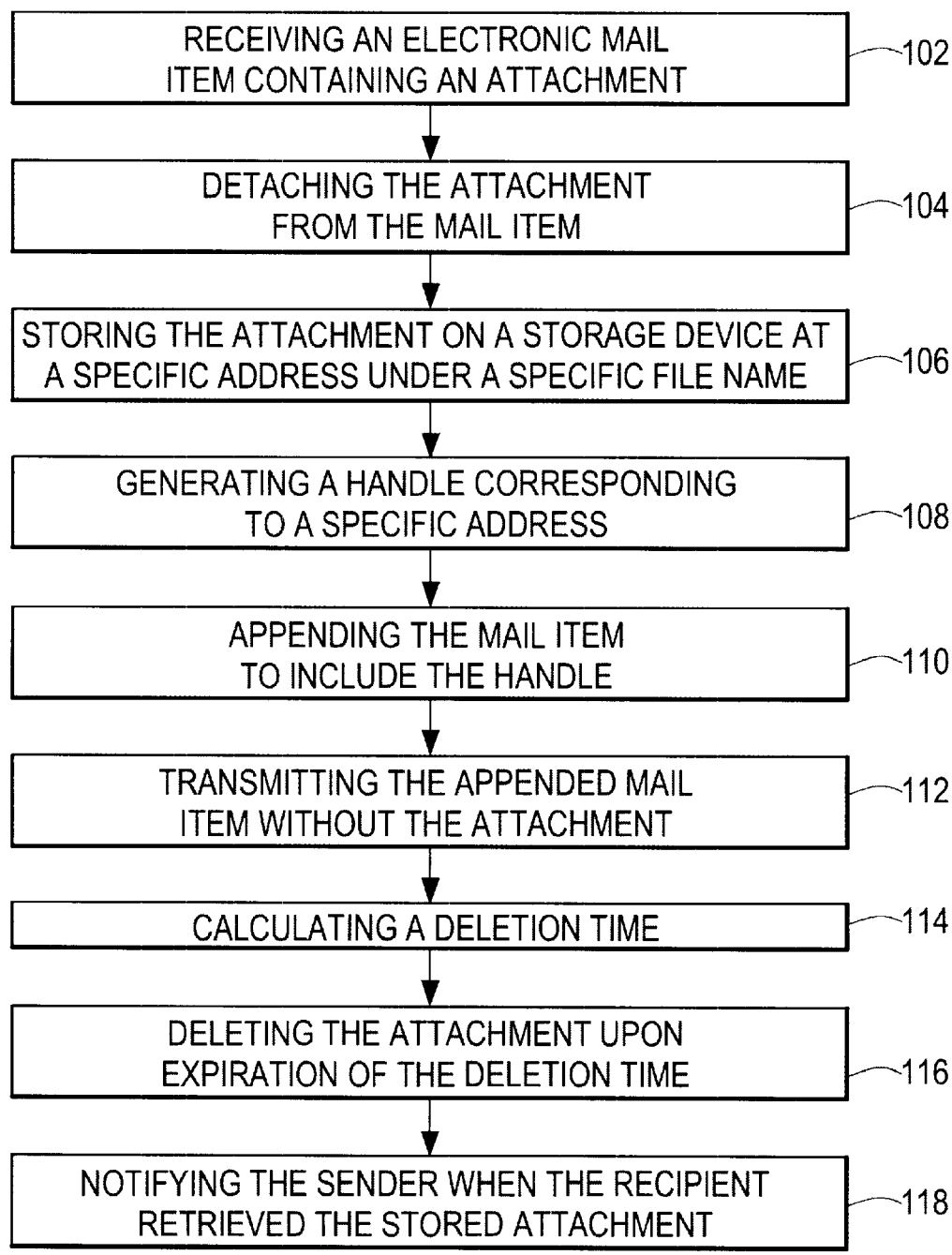
FIG. 2 is a flow chart of the network-based mail attachment storage method according to this invention.

Another embodiment of this invention is the network-based mail attachment storage method 100, FIG. 2, which includes the steps of: receiving 102 from a sender an electronic mail item which contains a forwarding specification and an attachment; detaching 104 the attachment from the electronic mail item; storing 106 the attachment on a storage device at a specific address under a specific file name; generating 108 a handle corresponding to the specific address and the specific file name; appending 110 the electronic mail item to include the handle; and transmitting 112 in accordance with the forwarding specification the appended electronic mail item, including the handle but excluding the stored attachment.

Network-based mail attachment storage method 100 further includes the steps of calculating 114 a deletion time after which the stored attachment is to be deleted; deleting 116 the stored attachment upon expiration of the calculated deletion time, and notifing 118 the sender when the recipient retrieves the stored attachment.

Figure 3:
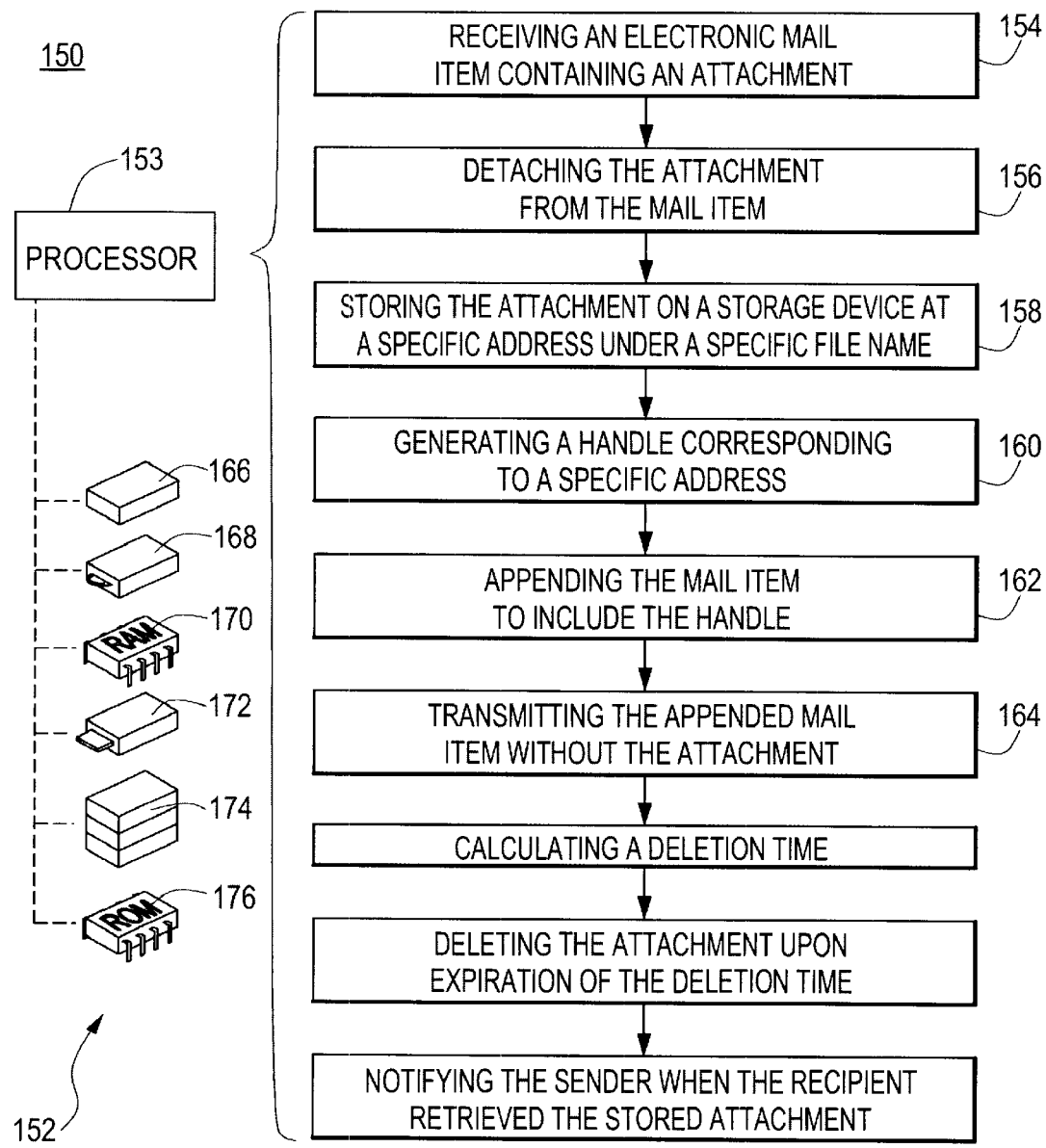
FIG. 3 is a diagrammatic view of another embodiment of the network-based mail attachment storage system according to this invention including a processor and a computer readable medium and a flow chart showing the sequence of executed steps.

Another embodiment of network-based mail attachment storage system 150, FIG. 3, includes a computer readable medium 152 having a plurality of instructions stored thereon which, when executed by the processor 153, cause that processor to perform the steps of: receiving 154 from a sender an electronic mail item which contains a forwarding specification and an attachment; detaching 156 the attachment from the electronic mail item; storing 158 the attachment on a storage device at a specific address under a specific file name; generating 160 a handle corresponding to the specific address and the specific file name; appending 162 the electronic mail item to include the handle; and transmitting 164 in accordance with forwarding specification the appended electronic mail item, including the handle but excluding the stored attachment.

Typical examples of computer readable medium 152 are: hard drive 166; optical drive 168; random access memory 170; tape drive 172; RAID array 174; and read only memory 176.

Figure 4:
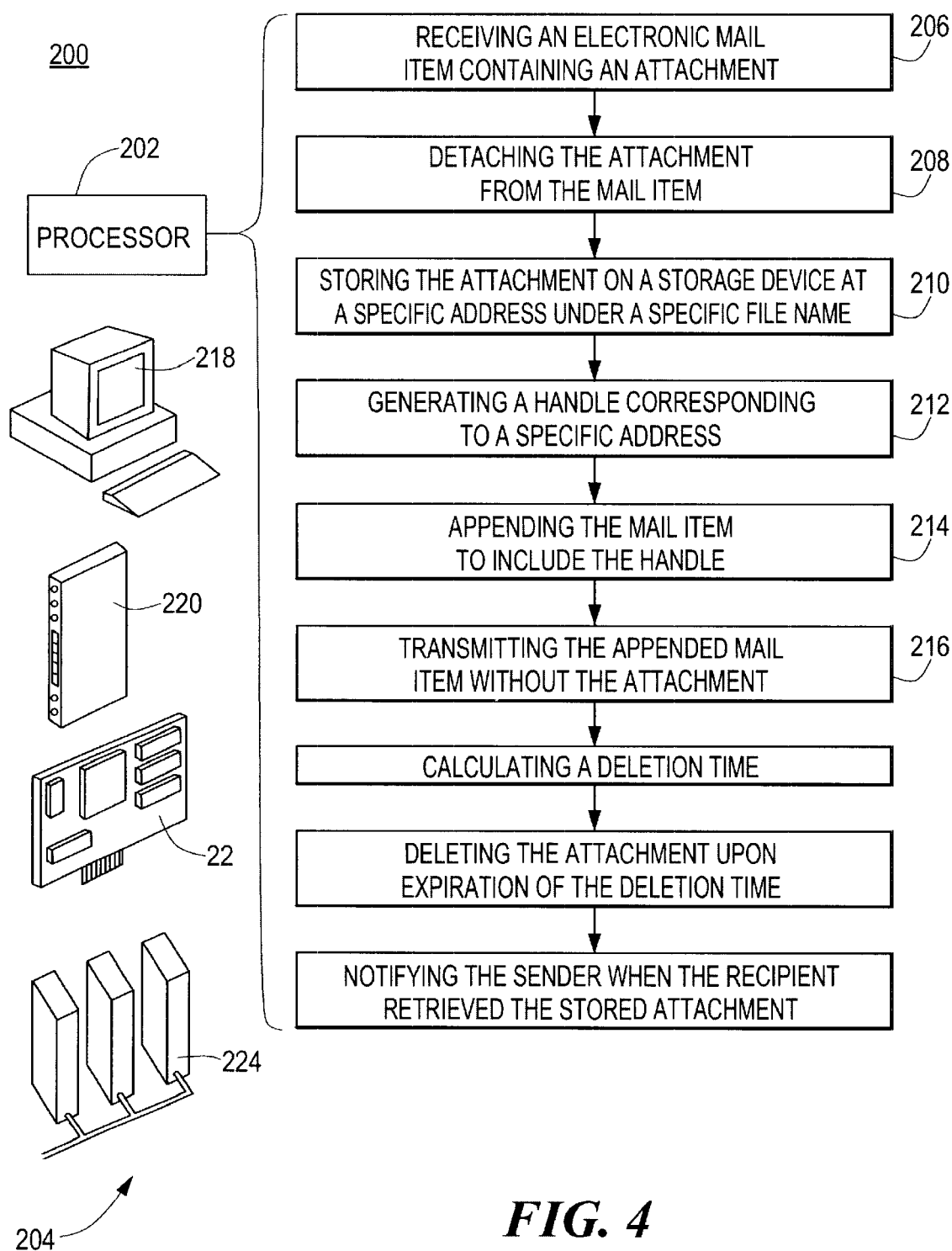
FIG. 4 is a diagrammatic view of another embodiment of the network-based mail attachment storage system according to this invention including a processor and lo memory and a flow chart showing the sequence of executed steps.

Another embodiment of network-based mail attachment storage system 200, FIG. 4, includes a processor 202 and memory 204 configured to perform the steps of: receiving 206 from a sender an electronic mail item which contains a forwarding specification and an attachment; detaching 208 the attachment from the electronic mail item; storing 210 the attachment on a storage device at a specific address under a specific file name; generating 212 a handle corresponding to the specific address and the specific file name; appending 214 the electronic mail item to include the handle; and transmitting 216 in accordance with the forwarding specification the appended electronic mail item, including the handle but excluding the stored attachment.

The processor 202 and memory 204 may be incorporated into: personal computer 218; programmable logic controller 220; single board computer 222; and an array of network servers 224.

It should be appreciated that these are only a few embodiments of the specific invention and that this system and method could be constructed using any combination of hardware/firmware components and software-based subroutines.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A network-based mail attachment storage system comprising:

a receiving portal distinct from an e-mail server of a recipient for receiving from a sender an electronic mail item which contains a two-part forwarding specification which arrives at said receiving portal and embeds the e-mail address of said recipient into an e-mail address at said receiving portal, and an attachment;

an attachment stripper for detaching said attachment from said electronic mail item;

a storage device for storing said stripped attachment at a specific address under a specific file name;

a handle generator for generating a handle corresponding to said address and file name which allows access to said attachment stored at said specific address under said specific file name;

a handle appender for appending said handle to said electronic mail item;

a parser for extracting said e-mail address of said recipient from said two-part forwarding specification; and a transmitting portal distinct from an e-mail server of a sender for transmitting to said recipient said appended electronic mail item including said handle but excluding said stored attachment.

2. The network-based mail attachment storage system of claim 1 further including a parser for extracting a recipient address from said forwarding specification.

3. The network-based mail attachment storage system of claim 2 further including an attachment retriever for enabling said recipient to retrieve, at a later date, said stored attachment stored under said specific file name at said specific address via said handle.

4. The network-based mail attachment storage system of claim 3 further including a policy interpreter for determining if said recipient is to be charged a fee for retrieving said stored attachments.

5. The network-based mail attachment storage system of claim 3 further including a sender notifier for notifying said sender when said recipient retrieved said stored attachment.

6. The network-based mail attachment storage system of claim 1 further including a deletion timer for calculating a deletion time after which said stored attachment is to be deleted.

7. The network-based mail attachment storage system of claim 6 further including an, attachment deleter for deleting said stored attachment upon the expiration of said deletion time.

8. The network-based mail attachment storage system of claim 1 further including an attachment comparator which compares said stored attachment to previously-stored attachments to determine if any attachments are identical.

9. The network-based mail attachment storage system of claim 8 further including a redundancy deleter which deletes said stored attachment when it is identical to a previously-stored attachment.

10. The network-based mail attachment storage system of claim 9 further including a handle redirector for redirecting the handle pointing to said deleted attachment so that it points to said identical previously-stored attachment.

11. The network-based mail attachment storage system of claim 1 in which said handle is a uniform resource locator.

12. The network-based mail attachment storage system of claim 1 in which said storage device is chosen from the group consisting of hard drives, optical drives, random access memories, tape drives and RAID arrays.

13. A network-based mail attachment storage method comprising the steps of:

receiving from a sender an electronic mail item which contains a two-part forwarding specification which identifies the e-mail address of a recipient, and an attachment;

detaching said attachment from said electronic mail item;

storing said attachment on a storage device at a specific address under a specific file name;

generating a handle corresponding to said specific address and said specific file name;

appending said electronic mail item to include said handle;

parsing said two-part forwarding specification to extract said e-mail address of said recipient; and transmitting to said recipient said appended electronic mail item including said handle but excluding said stored attachment.

14. The network-based mail attachment storage method of claim 13 further including the step of calculating a deletion time upon which the stored attachment is to be deleted.

15. The network-based mail attachment storage method of claim 14 further including the step of deleting said stored attachment upon the expiration of said deletion time.

16. The network-based mail attachment storage method of claim 15 wherein the step of receiving further includes a recipient address in said forwarding specification, the method further including the step of notifying said sender when said recipient retrieved said stored attachment.

17. A computer readable medium having a plurality of instructions stored thereon which, when executed by the processor, cause that processor to perform the steps of:

receiving from a sender an electronic mail item which contains a two-part forwarding specification which identifies the e-mail address of a recipient, and an attachment;

detaching said attachment from said electronic mail item;

storing said attachment on a storage device at a specific address under a specific file name;

generating a handle corresponding to said specific address and said specific file name;

appending said electronic mail item to include said handle;

parsing said two-part forwarding specification to extract said e-mail address of said recipient; and transmitting to said recipient said appended electronic mail item including said handle but excluding said stored attachment.

18. The computer readable medium of claim 17 in which said computer readable medium is a hard drive.

19. The computer readable medium of claim 17 in which said computer readable medium is a read-only memory.

20. The computer readable medium of claim 17 in which said computer readable medium is a random-access memory.

21. A processor and memory configured to perform the steps of:

receiving from a sender an electronic mail item which contains a two-part forwarding specification which identifies the e-mail address of a recipient, and an attachment;

detaching said attachment from said electronic mail item;

storing said attachment on a storage device at a specific address under a specific file name;

generating a handle corresponding to said specific address and said specific file name;

appending said electronic mail item to include said handle;

parsing said two-part forwarding specification to extract said e-mail address of said recipient; and transmitting to said recipient said appended electronic mail item including said handle but excluding said stored attachment.

22. The processor and memory of claim 21 in which said processor and memory are incorporated into a personal computer.

23. The processor and memory of claim 21 in which said processor and memory are incorporated into a programmable logic controller.

24. The processor and memory of claim 21 in which said processor and memory are incorporated into a single board computer.

25. The processor and memory of claim 21 in which said processor and memory are incorporated into an array of network servers.

26. A network-based mail attachment storage system comprising:

a receiving portal for receiving from a sender an electronic mail item which contains a two-part forwarding specification which arrives at said receiving portal and embeds the e-mail address of said recipient into an e-mail address at said receiving portal, and an attachment;

an attachment stripper for detaching said attachment from said electronic mail item;

a storage device for storing said stripped attachment at a specific address under a specific file name;

a handle generator for generating a handle corresponding to said address and file name which allows access to said attachment stored at said specific address under said specific file name;

a handle appender for appending said handle to said electronic mail item;

a parser for extracting said e-mail address of said recipient from said two-part forwarding specification;

a transmitting portal distinct from an e-mail server of a sender for transmitting to said recipient said appended electronic mail item including said handle but excluding said stored attachment; and an attachment comparator which compares said stored attachment to previously-stored attachments to determine if any attachments are identical.

27. The network-based mail attachment storage system of claim 26 further including a redundancy deleter which deletes said stored attachment when it is identical to a previously-stored attachment.

28. The network-based mail attachment storage system of claim 27 further including a handle redirector for redirecting the handle pointing to said deleted attachment so that it points to said identical previously-stored attachment.

29. A network-based mail attachment storage system for transmitting electronic mail items from a sender's e-mail server to a recipient's e-mail server, the system comprising:

a receiving portal remote from both the e-mail server of the sender and the e-mail server of the recipient for receiving from a sender an electronic mail item which contains a two-part forwarding specification which embeds the e-mail address of said recipient into an e-mail address at said receiving portal, and an attachment;

an attachment stripper operable on the receiving portal for detaching said attachment from said electronic mail item;

a storage device operable on the receiving portal for storing said stripped attachment at a specific address under a specific file name;

a handle generator operable on the receiving portal for generating a handle corresponding to said address and file name which allows the recipient access to said attachment stored at said specific address under said specific file name;

a handle appender for appending said handle to said electronic mail item; and a parser for extracting said e-mail address of said recipient from said two-part forwarding specification; and a transmitting portal distinct from an e-mail server of a sender for transmitting to said recipient said appended electronic mail item including said handle but excluding said stored attachment.

30. A network-based mail attachment storage system for transmitting electronic mail items from a sender's e-mail server to a recipient's e-mail server, the system comprising:

a receiving portal having an e-mail address for receiving from a sender an electronic mail item which contains a two-part forwarding specification comprising both the e-mail address of the recipient and the e-mail address of the receiving portal and configured to intercept the electronic mail and attachment before it is received by the recipient;

an attachment stripper for detaching said attachment from said electronic mail item;

a storage device for storing said stripped attachment at a specific address under a specific file name;

a handle generator for generating a handle corresponding to said address and said file name which allows the recipient access to said attachment stored at said specific address under said specific file name;

a handle appender for appending said handle to said electronic mail item;

a parser for extracting said e-mail address of said recipient from said two-part forwarding specification; and a transmitting portal distinct from an e-mail server of a sender for transmitting to said recipient said appended electronic mail item including said handle but excluding said stored attachment.

31. A network-based mail attachment storage system for transmitting electronic mail items from a sender's e-mail server to a recipient's e-mail server, the system comprising:

a receiving portal having an e-mail address and located remote from both the e-mail server of the sender and the e-mail server of the recipient for receiving from a sender an electronic mail item which contains a two-part forwarding specification comprising both the e-mail address of the recipient and the e-mail address of the receiving portal and configured to intercept the electronic mail and attachment before it is received by the recipient;

an attachment stripper for detaching said attachment from said electronic mail item;

a storage device for storing said stripped attachment at a specific address under a specific file name;

a handle generator for generating a handle corresponding to said address and file name which allows the recipient access to said attachment stored at said specific address under said specific file name;

a handle appender for appending said handle to said electronic mail item;

a parser for extracting said e-mail address of said recipient from said two-part forwarding specification; and a transmitting portal distinct from an e-mail server of a sender for transmitting to said recipient said appended electronic mail item including said handle but excluding said stored attachment.

* * * * *